US012284195B1

(12) United States Patent
Luttwak et al.

(10) Patent No.: US 12,284,195 B1
(45) Date of Patent: Apr. 22, 2025

(54) TECHNIQUES FOR DETECTING CLOUD IDENTITY MISUSE LEVERAGING RUNTIME CONTEXT

(71) Applicant: Wiz, Inc., New York, NY (US)

(72) Inventors: Ami Luttwak, Binyamina (IL); Alon Schindel, Tel Aviv (IL); Shir Tamari, Tel Aviv (IL); Ron Cohen, Tel Aviv (IL)

(73) Assignee: Wiz, Inc., New York, NY (US)

( * ) Notice: Subject to any disclaimer, the term of this patent is extended or adjusted under 35 U.S.C. 154(b) by 0 days.

(21) Appl. No.: 18/621,294

(22) Filed: Mar. 29, 2024

(51) Int. Cl.
*H04L 9/40* (2022.01)
(52) U.S. Cl.
CPC ................................ *H04L 63/1416* (2013.01)
(58) Field of Classification Search
USPC ............................................................. 726/23
See application file for complete search history.

(56) References Cited

U.S. PATENT DOCUMENTS

| | | | |
|---|---|---|---|
| 8,359,278 B2 | 1/2013 | Domenikos et al. | |
| 8,831,677 B2 | 9/2014 | Villa-Real | |
| 8,959,584 B2 | 2/2015 | Piliouras | |
| 9,679,125 B2 | 6/2017 | Bailor et al. | |
| 9,734,169 B2 | 8/2017 | Redlich et al. | |
| 10,608,903 B1* | 3/2020 | Jha | G06F 9/542 |
| 11,146,689 B1* | 10/2021 | Plappert | H04L 65/60 |
| 11,720,669 B1* | 8/2023 | Edwards | G06F 11/327 726/23 |
| 11,750,617 B2 | 9/2023 | Boland | |
| 12,008,222 B1* | 6/2024 | Niv | H04L 63/1416 |
| 2018/0167402 A1* | 6/2018 | Scheidler | G06N 20/00 |
| 2019/0229998 A1* | 7/2019 | Cattoni | H04L 43/50 |
| 2021/0234901 A1* | 7/2021 | Thomas | G06F 9/5027 |
| 2022/0070222 A1* | 3/2022 | Rao | H04L 63/20 |
| 2022/0103593 A1* | 3/2022 | Singh | H04L 63/0245 |
| 2023/0221983 A1* | 7/2023 | Heller | G06F 8/60 718/1 |
| 2024/0007492 A1* | 1/2024 | Shen | H04L 63/1425 |
| 2024/0089272 A1* | 3/2024 | Gilad | H04L 63/1416 |
| 2024/0106839 A1* | 3/2024 | Smith | H04L 63/1441 |
| 2024/0114040 A1* | 4/2024 | Venkatramani | H04L 63/20 |

* cited by examiner

*Primary Examiner* — Sakinah White Taylor
(74) *Attorney, Agent, or Firm* — M&B IP Analysts, LLC (57) ABSTRACT

A system and method for detecting cloud identity misuse in a cloud computing environment is presented. The method includes: deploying a runtime sensor on a workload in a cloud computing environment; continuously receiving data from the runtime sensor; generating an activity baseline based on the continuously received data, wherein the runtime sensor is configured to detect runtime processes on the workload; detecting an event in a cloud log, the event including an identifier of the workload; associating a runtime process detected by the runtime sensor on the workload with the event detected in the cloud log; and determining that the event is an anomalous event based on the generated activity baseline.

19 Claims, 8 Drawing Sheets

TECHNIQUES FOR DETECTING CLOUD IDENTITY MISUSE LEVERAGING RUNTIME CONTEXT

TECHNICAL FIELD

The present disclosure relates generally to identity management in cloud computing environments, and specifically to securing a computing environment from misuse of cloud identities.

BACKGROUND

Identity misuse in a computing environment refers to the unauthorized or inappropriate use of an individual's or entity's identity for malicious purposes. This can encompass various forms of digital identity, including usernames, passwords, biometric data, digital certificates, and other credentials used to authenticate users or entities within computer systems, networks, or online platforms. The dangers associated with identity misuse are multifaceted and can have severe consequences for both individuals and organizations.

One of the primary dangers of identity misuse is the risk of unauthorized access to sensitive information or resources. When attackers gain illicit access to an individual's or organization's identity credentials, they can exploit this access to infiltrate secure systems, databases, or applications. This can result in data breaches that compromise confidential data, such as personal information, financial records, or intellectual property. The unauthorized access to sensitive data not only violates privacy but can also lead to financial losses, legal liabilities, and reputational damage.

Furthermore, identity misuse can facilitate various forms of cybercrime, including financial fraud, identity theft, and phishing attacks. Attackers may use stolen identities to conduct fraudulent transactions, apply for loans or credit cards, or engage in other illicit activities under false pretenses. This not only poses a direct threat to individuals' financial security but can also undermine trust in online transactions and electronic commerce.

Moreover, identity misuse can have broader societal implications, as it erodes trust in digital systems and undermines the integrity of online interactions. When individuals' identities are compromised, it can lead to a loss of confidence in the security measures implemented by organizations and governments to protect personal data. This can ultimately hinder the adoption of digital technologies and impede economic growth and innovation.

By exploiting vulnerabilities in identity management systems, attackers can gain unauthorized access to sensitive information, perpetrate cybercrimes, and undermine the integrity of online interactions. It is essential for individuals, organizations, and policymakers to implement robust security measures and adhere to best practices for identity protection to mitigate the risks associated with identity misuse.

It would therefore be advantageous to provide a solution that would overcome the challenges noted above.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "some embodiments" or "certain embodiments" may be used herein to refer to a single embodiment or multiple embodiments of the disclosure.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

In one general aspect, method may include deploying a runtime sensor on a workload in a cloud computing environment. Method may also include continuously receiving data from the runtime sensor. Method may furthermore include generating an activity baseline based on the continuously received data, where the runtime sensor is configured to detect runtime processes on the workload. Method may in addition include detecting an event in a cloud log, the event including an identifier of the workload. Method may moreover include associating a runtime process detected by the runtime sensor on the workload with the event detected in the cloud log. Method may also include determining that the event is an anomalous event based on the generated activity baseline. Other embodiments of this aspect include corresponding computer systems, apparatus, and computer programs recorded on one or more computer storage devices, each configured to perform the actions of the methods.

Implementations may include one or more of the following features. Method may include: inspecting a code object for a cybersecurity object, the code object utilized in deploying the workload in the cloud computing environment; associating the runtime process with the event based on an identifier of the workload and the cybersecurity object, where the cybersecurity object indicates an identity utilized by the workload. Method may include: generating the activity baseline based on a plurality of events detected in the continuously received data. Method may include: generating the activity baseline only based on a group of events of the plurality of events corresponding to a first event type. Method may include: generating the activity baseline based on a plurality of workload runtime data, each workload sharing a common identifier. Method may include: removing a data point from the activity baseline based on an eviction policy. Method may include: detecting a plurality of processes by the runtime sensor on the workload; and generating an unique activity baseline for each detected process. Method may include: generating the activity baseline further based on detected events in the cloud log. Method where the anomalous event indicates any one of: a process which calls an application programming interface (API) with a target account that was not previously called, a process generating an API call from a location in code that never performed an API call previously, an API call which the workload has never performed previously, and any combination thereof. Implementations of the described techniques may include hardware, a method or process, or a computer tangible medium.

In one general aspect, non-transitory computer-readable medium may include one or more instructions that, when executed by one or more processors of a device, cause the device to: deploy a runtime sensor on a workload in a cloud computing environment; continuously receive data from the runtime sensor; generate an activity baseline based on the continuously received data, where the runtime sensor is configured to detect runtime processes on the workload; detect an event in a cloud log, the event including an identifier of the workload; associate a runtime process detected by the runtime sensor on the workload with the event detected in the cloud log; and determine that the event is an anomalous event based on the generated activity baseline. Other embodiments of this aspect include corresponding computer systems, apparatus, and computer programs recorded on one or more computer storage devices, each configured to perform the actions of the methods.

In one general aspect, system may include a processing circuitry. System may also include a memory, the memory containing instructions that, when executed by the processing circuitry, configure the system to deploy a runtime sensor on a workload in a cloud computing environment. System may in addition continuously receive data from the runtime sensor. System may moreover generate an activity baseline based on the continuously received data, where the runtime sensor is configured to detect runtime processes on the workload. System may also detect an event in a cloud log, the event including an identifier of the workload. System may furthermore associate a runtime process detected by the runtime sensor on the workload with the event detected in the cloud log. System may in addition determine that the event is an anomalous event based on the generated activity baseline. Other embodiments of this aspect include corresponding computer systems, apparatus, and computer programs recorded on one or more computer storage devices, each configured to perform the actions of the methods.

Implementations may include one or more of the following features. System where the memory contains further instructions which when executed by the processing circuitry further configure the system to: inspect a code object for a cybersecurity object, the code object utilized in deploying the workload in the cloud computing environment; and associate the runtime process with the event based on an identifier of the workload and the cybersecurity object, where the cybersecurity object indicates an identity utilized by the workload. System where the memory contains further instructions which when executed by the processing circuitry further configure the system to: generate the activity baseline based on a plurality of events detected in the continuously received data. System where the memory contains further instructions which when executed by the processing circuitry further configure the system to: generate the activity baseline only based on a group of events of the plurality of events corresponding to a first event type. System where the memory contains further instructions which when executed by the processing circuitry further configure the system to: generate the activity baseline based on a plurality of workload runtime data, each workload sharing a common identifier. System where the memory contains further instructions which when executed by the processing circuitry further configure the system to: remove a data point from the activity baseline based on an eviction policy. System where the memory contains further instructions which when executed by the processing circuitry further configure the system to: detect a plurality of processes by the runtime sensor on the workload; and generate an unique activity baseline for each detected process. System where the memory contains further instructions which when executed by the processing circuitry further configure the system to: generate the activity baseline further based on detected events in the cloud log. System where the anomalous event indicates any one of: a process which calls an application programming interface (API) with a target account that was not previously called, a process generating an API call from a location in code that never performed an API call previously, an API call which the workload has never performed previously, and any combination thereof. Implementations of the described techniques may include hardware, a method or process, or a computer tangible medium.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

DETAILED DESCRIPTION

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

Figure 1:
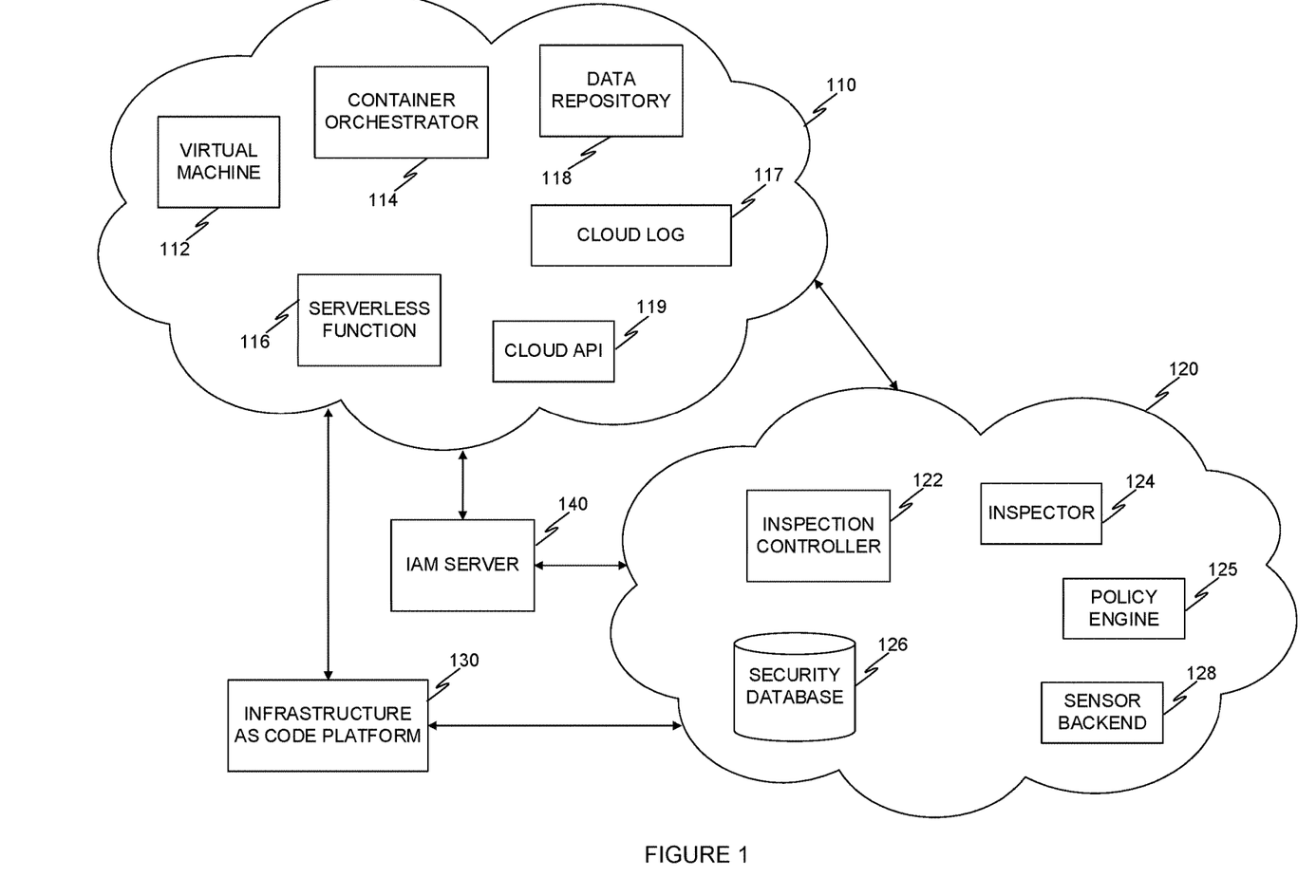
FIG. 1 is an example schematic diagram of a cloud computing environment monitored for a cybersecurity threat by an inspection environment, implemented in accordance with an embodiment.

FIG. 1 is an example schematic diagram of a cloud computing environment monitored for a cybersecurity threat by an inspection environment, implemented in accordance with an embodiment. In an embodiment, a cloud computing environment 110 is implemented as a virtual private cloud (VPC), Virtual Network (VNet), virtual private network (VPN) and the like, over a cloud computing platform. A cloud computing platform may be provided, for example, by Amazon® Web Services (AWS), Google® Cloud Platform (GCP), Microsoft® Azure, and the like.

In an embodiment, a cloud computing environment 110 includes cloud entities deployed therein. According to an embodiment, a cloud entity is, for example, a principal, a resource, a combination thereof, and the like. In an embodiment, a resource is a cloud entity which provides access to a compute resource, such as a processor, a memory, a storage, and the like.

In some embodiments a resource is a virtual machine, a software container, a serverless function, and the like. According to certain embodiments, a resource includes a software application deployed thereon, such as a webserver, a gateway, a load balancer, a web application firewall (WAF), an appliance, various combinations thereof, and the like.

In certain embodiments, a principal is a cloud entity which is authorized to initiate actions in the cloud computing environment. According to the some embodiments, a cloud entity is, for example, a user account, a service account, a role, and the like. In some embodiments, a cloud entity is a principal relative to another cloud entity, and a resource to other cloud entities. For example, a load balancer is a resource to a user account requesting a webpage from a webserver behind the load balancer, and the load balancer is a principal to the webserver.

The cloud computing environment 110 includes a plurality of resources, such as virtual machine 112, software container orchestrator 114, and serverless function 116. A virtual machine 112 may be deployed, for example, utilizing Oracle® VirtualBox®. A software container orchestrator 114 may be deployed, for example, utilizing a Docker® engine, a Kubernetes® engine, and the like. In an embodiment, a software container orchestrator 114 is configured to deploy a software cluster, each cluster including a plurality of nodes. In an embodiment, a node includes a plurality of pods. A serverless function 116, may be, for example, utilized with Amazon® Lambda. In an embodiment, the serverless function 116 is a serverless function container image.

In an embodiment, the cloud computing environment 110 includes a data repository 118. According to an embodiment, the data repository 118 includes a code object, a software image, a software library, a software binary, and the like. In an embodiment, a workload, a resource, and the like, are deployed in the cloud computing environment 110 based on a code object, software image, and the like, which is accessed from the data repository 118.

In some embodiments, the cloud computing environment 110 includes a cloud application programming interface (API). In certain embodiments, the cloud API 119 is utilized to access resources of the cloud computing environment 110. For example, in an embodiment, a resource is configured to generate an API call. In an embodiment, a process deployed on a virtual machine 112 initiates an API call, from example to the cloud API 119.

In certain embodiments, the cloud computing environment 110 is configured to utilize an identity and access management (IAM) server 140. In some embodiments, the IAM server 140 is configured to manage identities of the cloud computing environment 110. In an embodiment, the IAM server 140 is configured to associate a cloud identity, such as a user account, a service account, a role, a user group, a combination thereof, and the like, with a permission, an authorization, a combination thereof, and the like.

According to an embodiment, the cloud computing environment 110 is connected to an infrastructure as code (IaC) platform 130. In an embodiment, an IaC platform 130 utilizes, for example, Terraform®. In certain embodiments, a workload is deployed in the cloud computing environment 110 based on a code object from the IaC platform 130.

In some embodiments, a code object includes a code instruction utilized to assume a role, call a role, initiate an action in a computing environment, a combination thereof, and the like.

In certain embodiments, workloads, processes deployed on workloads, principals, and the like, generate actions, events, and the like, in the cloud computing environment 110. In some embodiments, a cloud log system 117 is configured to generate a log event based on an action, an event, a combination thereof, and the like.

For example, in an embodiment, a serverless function 116 is configured to initiate an action utilizing the cloud API 119. In certain embodiments, the cloud log system 117 is configured to generate a data record (e.g., a log event) in a cloud log including data describing the initiated action. In some embodiments, the data record includes an identifier of the serverless function, an IP address, an identifier of the API call, a combination thereof, and the like.

According to an embodiment, the cloud computing environment 110 includes a plurality of resources as discussed in more detail herein. Each such resource is susceptible to various cybersecurity threats. Such threats can become apparent for example due to a software version of an application in a software container 114, an operating system (OS) version of a virtual machine 112, a misconfiguration in code of a serverless function 116, and the like. In an embodiment, the cloud computing environment 110 is monitored for cybersecurity threats by an inspection environment 120. In an embodiment, the inspection environment is implemented as a cloud computing environment, including a VPC, VNet, VPN, and the like.

In an embodiment, each of the virtual machine 112, the software container 114, and the serverless function 116 include a sensor configured to a particular resource, resource type, combination thereof, and the like. An example deployment of a sensor is discussed in more detail in FIG. 2 below.

In an embodiment, the sensor (not shown in FIG. 1) is configured to listen for events, packets, and the like, on a data link layer. In some embodiments, the sensor is configured to detect run-time events, running processes, and the like, on the resource on which the sensor is deployed.

For example, according to an embodiment, the sensor is configured to utilize an eBPF interface, which allows non-intrusive monitoring of the data link layer communication. In certain embodiments, the sensor is further configured to send data to and receive data from a sensor backend server 128. The sensor backend server 128 is a workload, such as a virtual machine, software container, serverless function, combination thereof, and the like, which is deployed in the inspection environment 120.

In an embodiment, the sensor backend server 128 is configured to receive sensor generated data. For example, the sensor backend server 128 is configured, in an embodiment, to receive events from a sensor.

In some embodiments, the sensor is configured to request from the sensor backend server 128 rules, definitions, and the like, which the sensor is configured to apply to events, for example as detected on an eBPF interface. For example, a predetermined event, such as indicating access to an IP address, IP address range, and the like, may be checked against a definition.

According to certain embodiments, a definition is a logical expression which, when applied to an event, yields a "true" or "false" result. In an embodiment, a rule is a logical expression which includes an action. For example, a rule may be that if a certain definition is true when applied to an event, data pertaining to the event should be sent to the sensor backend server 128.

In some embodiments, the sensor backend server 128 is configured to initiate inspection of a resource deployed in the cloud computing environment 110. For example, the sensor backend server 128 may be configured to initiate such inspection in response to receiving an event, data, a combination thereof, and the like, from a sensor deployed on a resource.

In an embodiment, initiating inspection of a resource is performed by generating an instruction for an inspection controller 122, the instruction, when executed, configures an inspector 124 to inspect the resource.

For example, a sensor is configured to send event data to the sensor backend server 128 in response to detecting that a definition, applied by the sensor to a detected event, results in a "true" value when applied. As an example, the definition may be "is the IP address in the range of 127.0.0.1 through 127.0.0.99", which in this example correspond to an IP address range used by a malware, such as a cryptominer. When the definition is applied, for example to a detected network packet, and the result is "true", the sensor is configured to send data pertaining to the event to the sensor backend server 128. Data pertaining to the event may be, for example, an IP address, an event type, combinations thereof, and the like.

In an embodiment, the sensor backend server 128 is configured to receive the data. In some embodiments, the sensor backend server 128 is further configured to apply a rule to the received data to determine if an inspection of the workload on which the sensor is deployed should be inspected for a cybersecurity threat. For example, the sensor backend server 128 is configured to generate an instruction to inspect a virtual machine 112, in response to receiving an indication from a sensor deployed as service on the virtual machine that a communication has been detected between the virtual machine 112 and a server having an IP address which is a forbidden IP address, such as an IP address associated with a malware.

For example, the sensor backend server 128 may generate an instruction for the inspection controller 122, which when executed by the inspection controller generates a an inspectable disk, for example utilizing a snapshot, a copy, a clone, and the like of a disk (not shown) associated with the virtual machine 112, and provides access to an inspector 124 to the inspectable disk. In an embodiment the inspector 124 is configured to detect a cybersecurity threat. For example, the inspector 124 is configured to receive, in an embodiment, a hash of an application stored on the inspectable disk, and determine if the hash matches a hash of known malware applications. In certain embodiments, the inspector 124 is provided with a persistent volume claim (PVC) to the inspectable disk.

In some embodiments, the sensor is configured to generate a hash of an application on the resource, such as the virtual machine 112, on which it is deployed, and send the hash to the sensor backend server 128. The received hash may then be compared, for example by providing it to the inspector 124, with known hash values which correspond to malware applications.

While the examples above discuss malware and cryptominers, it is readily apparent that the sensor and inspector 124 may be utilized to detect other types of cybersecurity threats, such as an exposure, a vulnerability, a weak password, an exposed password, a misconfiguration, and the like.

In an embodiment, the inspection controller 122 is configured to allocate inspectors, such as inspector 124, initiate inspection for cybersecurity objects, provision inspectable disks, a combination thereof, and the like. In some embodiments, a cybersecurity object is a secret, a certificate, a software application, a software library, a software binary, an operating system, a code object, a hash of an object, a signature, a combination thereof, and the like.

In some embodiments, the inspection controller 122 is configured to inspect a workload to associate with an identity. For example, in an embodiment, an inspection controller 122 is configured to detect an identity from the IAM server 140, the identity associated with a permission.

In some embodiments, the inspection controller 122 is further configured to detect a secret associated with the identity. In certain embodiments, the inspection controller 122 is configured to detect a code object from an IaC platform 130 and detect an API call, a role assumption, an identity identifier, and the like, and associate the code object with the identity based on such a detection.

In certain embodiments, the inspection environment 120 further includes a security database 126. In some embodiments, the security database 126 is implemented as a graph database such as Neo4j®. In an embodiment, the security database 126 is configured to generate a representation of the cloud computing environment 110, such as cloud computing environment 110. For example, in an embodiment, the representation is based on a predefined unified data schema, so that each different cloud platform is represented using a unified data schema, allowing for a unified representation.

For example, according to an embodiment, a principal is represented by a predefined data structure, each principal represented by a node in the security graph. Likewise, a resource is represented by another predefined data structure, each resource represented by a node in the security graph, according to certain embodiments.

In certain embodiments, data received from a sensor deployed on a resource in the cloud computing environment may be stored in the graph database as part of the security graph. In the example above, in response to receiving data from the sensor which indicates a potential malware infection of the virtual machine 112, the sensor backend server 128 is configured, in an embodiment, to: generate a node representing the malware in the security database 126, generate a node in the security database 126 representing the virtual machine 112, and connect the node representing the malware with the node representing the virtual machine 112.

In some embodiments, the inspection environment includes a policy engine 125. In an embodiment, the policy engine 125 is configured to provide a sensor with a rule, a condition, a policy, and the like, which the sensor is configured to enforce on the workload.

Figure 2:
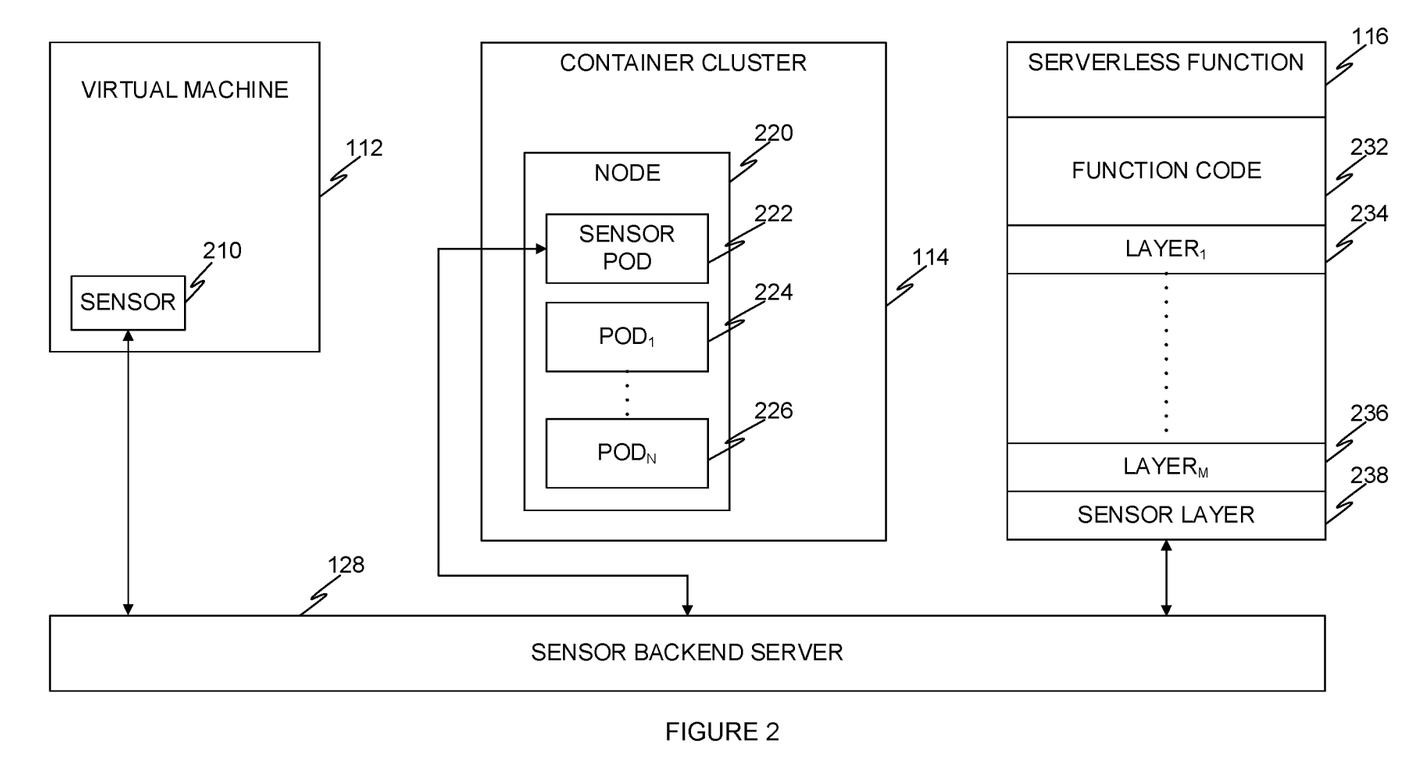
FIG. 2 is an example schematic illustration of a sensor backend server communicating with a plurality of sensors deployed on various workloads, implemented in accordance with an embodiment.

FIG. 2 is an example schematic illustration of a sensor backend server communicating with a plurality of sensors deployed on various workloads, implemented in accordance with an embodiment. In some embodiments, a sensor backend server 128 is configured to communicate with a machine (not shown) having a sensor installed thereon and communicatively coupled with the sensor backend server 128. In an embodiment, the machine is bare metal machine, a computer device, a networked computer device, a laptop, a tablet, and the like computing devices.

In an embodiment, a sensor backend server 128 is implemented as a virtual machine, a software container, a serverless function, a combination thereof, and the like. In certain embodiments, a plurality of sensor backend servers 128 are implemented. In some embodiments where a plurality of sensor backend servers 128 are utilized, a first group of sensor backend servers of the plurality of sensor backend servers is configured to communicate with a sensor deployed on a first type of resource (e.g., virtual machine), a second group of sensor backend servers is configured to communicate with resources of a second type, etc.

In an embodiment, a first group of sensor backend servers is configured to communicate with sensors deployed on resources in a first cloud computing environment deployed on a first cloud platform (e.g., AWS) and a second group of sensor backend servers is configured to communicate with sensors deployed on resources in a second cloud computing environment deployed on a second cloud platform (e.g., GCP).

A virtual machine 112 includes a sensor 210. In an embodiment, the sensor 210 is deployed as a service executed on the virtual machine 112. In some embodiments, a virtual machine 112 is configured to request binary code, a software package, and the like, for example from a sensor backend sever 128, which when executed by the virtual machine 112 cause a sensor 210 to run as a service on the virtual machine 112. The sensor 210 is configured to listen to a data link layer communication, for example through an eBPF interface.

A container cluster 114 runs a daemonset, and includes a plurality of nodes, such as node 220. The daemonset ensures that each node 220 runs a daemonset pod 222, which is configured as a sensor. For example, a Kubernetes® cluster may execute a daemonset configured to deploy a daemonset pod on each deployed node, wherein the daemonset pod is configured to listen to a data link layer communication, for example through an eBPF interface, to communication of a plurality of pods, such as pod-1 224 through pod-N 226, where 'N' is an integer having a value of '1' or greater. The daemonset pod 222 is configured, in an embodiment, to communicate with the sensor backend server 128.

A serverless function 116 includes, in an embodiment, a function code 232, and a plurality of code layers 1 through M (labeled respectively as 234 through 236), where 'M' is an integer having a value of '1' or greater. For example, in AWS Lambda a layer contains, in an embodiment, code, content, a combination thereof, and the like. In some embodiments, a layer, such as layer 234 includes runtime data, configuration data, software libraries, and the like.

In certain embodiments, the serverless function 116 includes a sensor layer 238. The sensor layer 238 is configured, in an embodiment, to listen to a data link layer communication of the serverless function 116, for example through an eBPF interface.

The sensor service 210, daemonset pod 222, and sensor layer 238 are each an implementation of a sensor, according to an embodiment. In an embodiment, a sensor is configured to communicate with a sensor backend server 128 through a transport layer protocol, such as TCP. For example, the sensor backend server 128 is configured, in an embodiment, to listen to a predetermined port using a TCP protocol, and a sensor, such as sensor 210, daemonset pod 222, and sensor layer 238 are each configured to communicate with the backend sensor server 128, for example by initiating communication using TCP over the predetermined port.

Figure 3:
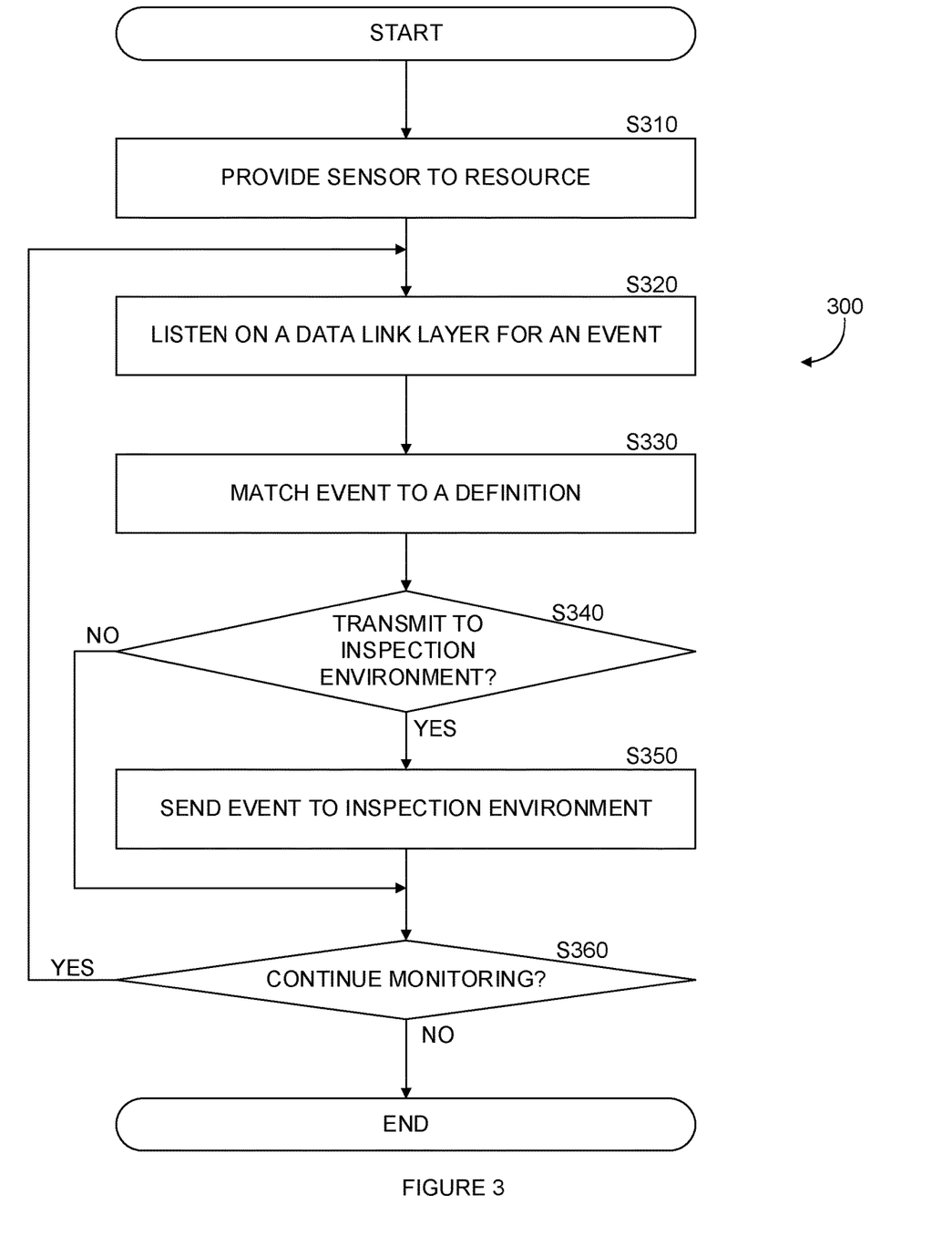
FIG. 3 is an example flowchart of a method for performing cybersecurity threat detection on a resource in a cloud computing environment, implemented in accordance with an embodiment.

FIG. 3 is an example flowchart 300 of a method for performing cybersecurity threat detection on a resource in a cloud computing environment, implemented in accordance with an embodiment.

At S310, a resource is provided with a sensor software. In an embodiment, the resource is any one of a virtual machine, a software container, a serverless function, and the like. In certain embodiments, the sensor software is provided based on the resource type. For example, a virtual machine is provided with a software package, such as an executable code, for example a binary code. A software container engine is provided with a daemonset, so that, in an embodiment where a node is deployed in a cluster of the software container engine, the node includes a daemonset pod which is configured to provide the functionality of a sensor, for example such as detailed above. In an embodiment, a serverless function is provided with a sensor layer by providing a code for example in a .ZIP file.

In an embodiment, providing a sensor includes configuring a resource, such as a virtual machine, software container, serverless function, and the like, to receive software which, when executed, configures the resource to deploy a sensor thereon.

At S320, an event is detected from a data link layer communication. In an embodiment, the data link layer is monitored through an eBPF interface for events. In certain embodiments, a software bill of materials (SBOM) is generated. An SBOM may be implemented as a text file, which is based off of events which were detected, for example through the eBPF interface. In an embodiment, an SBOM includes an identifier of a library which is accessed in runtime, an identifier of a binary which is accessed in runtime, an image of which an instance is deployed in runtime, a port which is accessed by a runtime program, a cryptographic hash function value (such as an SHA1, SHA2, and the like values), and the like. For example, an SBOM may include:

```
programs {
    exe_name: "/usr/sbin/rpc.mountd"
    last_seen: 1663138800
    exe_size: 133664
    exe_sha1:
        "200f06c12975399a4d7a32e171caabfb994f78b9"
    modules {
        path: "/usr/lib/libresolv-2.32.so"
        last_seen: 1663138800
    }
    modules {
        path: "/usr/lib/libpthread-2.32.so"
        last_seen: 1663138800
    }
    modules {
        path: "/usr/lib/ld-2.32.so"
        last_seen: 1663138800
    }
    modules {
        path: "/usr/lib/libc-2.32.so"
        last_seen: 1663138800
    }
    modules {
        path: "/usr/lib/libtirpc.so.3.0.0"
        last_seen: 1663138800
    }
    modules {
        path: "/usr/lib/libnss_files-2.32.so"
        last_seen: 1663138800
    }
```

```
    modules {
        path: "/usr/sbin/rpc.mountd"
        last_seen: 1663138800
    }
    listening_sockets {
        ip_addr: "0.0.0.0"
        port: 60311
    }
    listening_sockets {
        ip_addr: "0.0.0.0"
        port: 43639
    }
```

This portion of an SBOM indicates that a remote procedure call (RPC) is executed, which is configured to receive a client request to mount a file system.

At S330, the event is matched to a definition. In some embodiments, a definition includes a logical expression, which when applied to an event results in a "true" or "false" value. For example, a definition may state "software library xyz is accessed", with a result being either true or false, when applied to an event. In some embodiments, a rule is applied to an event. In an embodiment, a rule is a logical expression which further includes an action. For example, a rule states, in an embodiment, "IF software library xyz is accessed by UNKNOWN SOFTWARE, generate an alert". In this example, where an event is detected in which a software having an unknown identifier, for example which does not match a list of preapproved identifiers, attempts to access software library xyz, an alert is generated to indicate that such access is performed.

At S340, a check is performed to determine if data should be transmitted to an inspection environment. In some embodiments, the check is performed by applying a rule to an event, and determining transmission based on an output of applying the rule. If 'yes', execution continues at S350, if 'no' execution continues at S360.

At S350, data respective of an event is transmitted to an inspection environment. In an embodiment, the data is based on an SBOM file. In some embodiments, the data includes event data, such as an identifier of a resource (e.g., virtual machine, software container, serverless function, etc.), an identifier of an application, a hash value, a uniform resource locator (URL) request, a software library identifier, a software binary file identifier, a timestamp, and the like.

At S360, a check is performed to determine if monitoring of the resource should continue. For example, a daemonset of a container may be configured to periodically deploy a daemonset pod to monitor pods in a node. As another example, a virtual machine may be configured to periodically deploy a sensor service which runs as a process on the virtual machine, terminate the process after a predetermined period of time, terminate the process after a predetermined number of detected events, and the like.

In some embodiments, the check is performed based on a predetermined amount of elapsed time (e.g., every four hours, every day, twice a day, etc.). If 'yes', execution continues at S320. If 'no', in an embodiment execution terminates. In some embodiments, if 'no', another check is performed at S360, for example after a predetermined period of time has lapsed.

Figure 4:
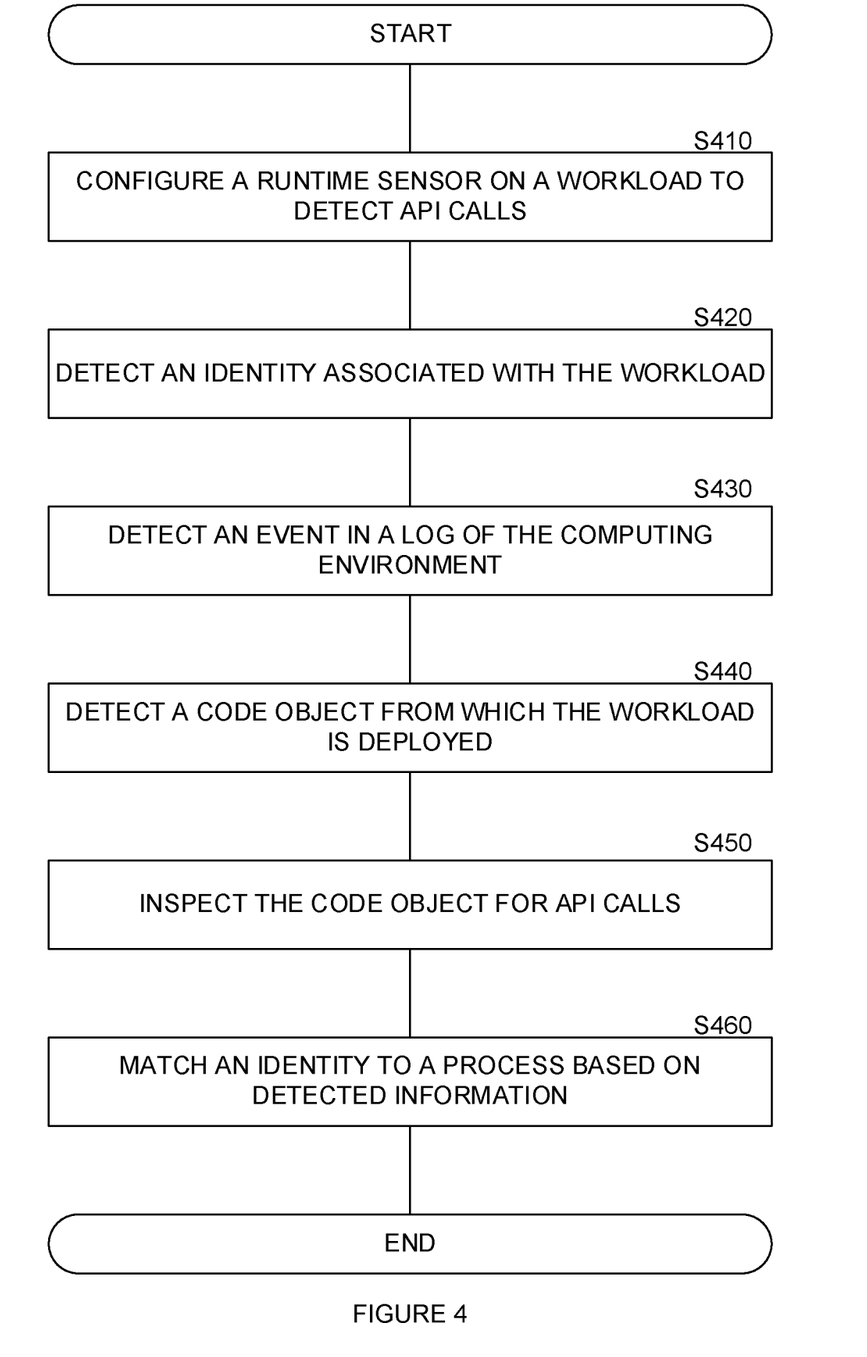
FIG. 4 is an example flowchart of a method for associating a cloud identity with a workload process.

FIG. 4 is an example flowchart of a method for associating a cloud identity with a workload process. In an embodiment, a process is an instance of a computing program, for example being executed by at least a thread. This is in contrast, according to an embodiment, of a computer program, which is a passive collection of computer instructions.

In an embodiment, a workload includes a plurality of computing programs, only a portion of which are actually running as processes on the workload. In some embodiments, a process is configured to initiate actions in the computing environment, in a cloud computing environment, and the like.

At S410, a sensor is deployed on a workload. In an embodiment, the sensor is a runtime sensor. In some embodiments, the sensor is deployed as a process on the workload. In certain embodiments, the sensor is a runtime process, a task, a combination thereof, and the like.

In an embodiment, a sensor deployed on a workload is configured to detect API calls. For example, in some embodiments, the sensor is configured to detect cloud API calls. In an embodiment, the sensor is configured to detect a principal, such as a role, utilized with the API call.

At S420, an identity is detected. In an embodiment, detecting an identity includes detecting a principal associated with the workload. According to some embodiments, a disk of a workload is inspected to detect a secret. In an embodiment, a secret is a cryptographic key, a certificate, a token, and the like. In some embodiments, the secret is utilized to access a resource.

In an embodiment, inspecting the disk includes generating an inspectable disk based on the disk of the workload, and detecting the secret on the inspectable disk. In some embodiments, an IAM server is queried to detect an identity associated with the secret. In an embodiment, the secret includes an identifier of a principal, a resource, and the like, which is configured to utilized the secret.

In some embodiments, the identity is detected by a sensor configured to detect an identity in an API call. In certain embodiments, the identity is a managed identity, a service principal, a user account, a service account, a user role, a user group, a combination thereof, and the like.

At S430, an event is detected. In an embodiment, the event is detected in a log of the computing environment. For example, in some embodiments, entities of the computing environment initiate actions, events, and the like, and such are recorded in a log, such as a cloud log. In some embodiments, a cloud log is, for example, Amazon® CloudTrail.

In certain embodiments, an inspection controller is configured to detect events in a log of the computing environment. In some embodiments, the inspection controller is configured to detect only predetermined event types. In an embodiment, an event is detected based on an identifier, such as an identifier of a principal, an identifier of a process, an IP address, a computing environment identifier, a combination thereof, and the like.

At S440, a code object is detected. In an embodiment, the code object corresponds to code which is utilized to deploy the workload in the computing environment. According to some embodiments, the code object is part of a code file, such as a Terraform file. In an embodiment, a code object is utilized to deploy a plurality of workloads in the computing environment.

For example, in an embodiment, a code object is a code portion of a declaratory code utilized in an infrastructure as code platform. In some embodiments, the code object includes a plurality of lines of code.

In some embodiments, a code object is detected based on an identifier of a workload, an identifier of an identity, a principal, and the like. In some embodiments, a code object is associated with a workload, for example as a representation is a security database. In certain embodiments, a representation of the code object is connected in the security database to a representation of the workload.

At S450, the code object is inspected. In an embodiment, inspecting a code object includes detecting a cybersecurity object in the code object. In some embodiments, a cybersecurity object is a secret, a certificate, a cryptographic key, a software application, a software library, a software binary, an operating system, a code object, a hash of an object, a signature, a software artifact, a combination thereof, and the like.

In an embodiment, a representation of the code object is generated and stored in a security database. In some embodiments, a representation of a principal, an API call, and the like, are stored in the security database and connected to the representation of the code object.

At S460, the identity is matched to a process. In an embodiment, the process is a process running on the workload and detected by the sensor as a running process. In some embodiments, the inspection controller is configured to match data received from the sensor (e.g., runtime data) with data received by performing static analysis of code objects, disks, and the like, in the computing environment, and further match the runtime data and static analysis with events detected in a log of the computing environment.

For example, in an embodiment, a process is detected by the sensor on a workload, which performs a cloud API call with a machine role to terminate an instance. In an embodiment, the instruction to terminate the instance generates an event in a cloud log. According to an embodiment, the event is matched to the process, based, for example, on a detection of an identifier of the workload in the event record.

According to certain embodiments, an identity matched to a process is stored in a security database. In some embodiments, an enriched log is generated based on predetermined event types and sensor data, such that an event from the cloud log is enriched with a process identifier of a workload based on sensor data. In an embodiment, the enriched log is further enriched with static analysis data detected by inspecting a disk of the workload.

Figure 5:
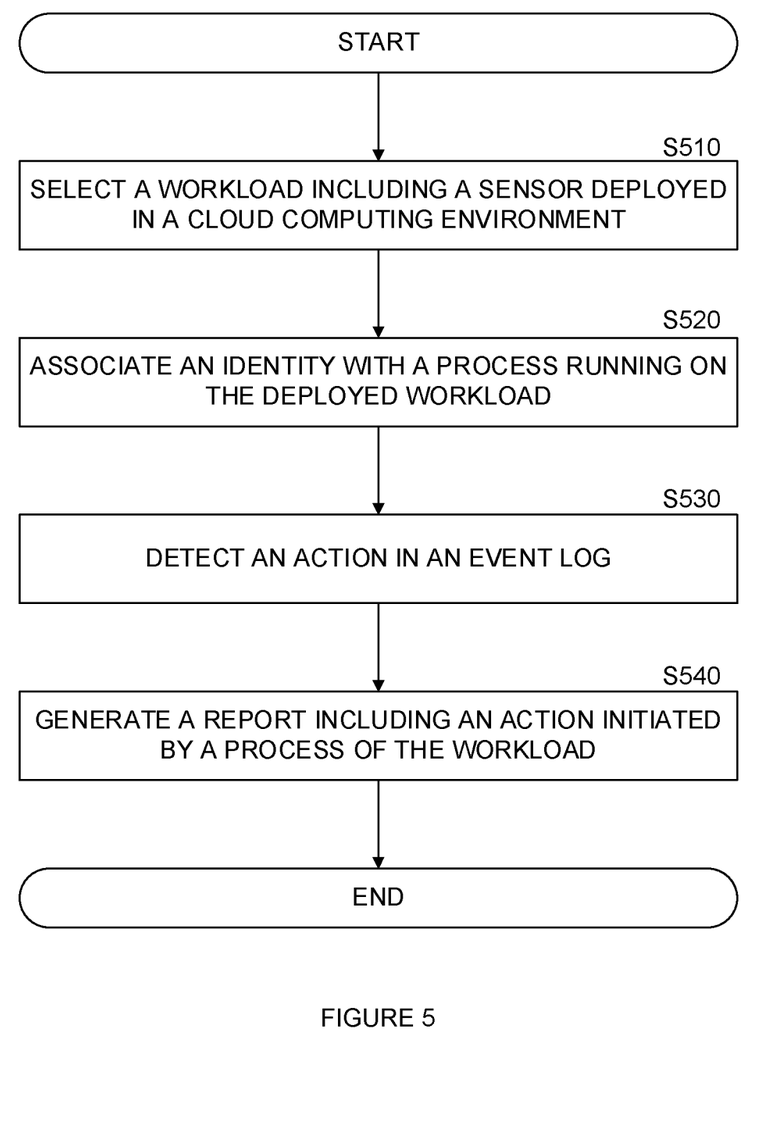
FIG. 5 is an example flowchart of a method for detecting an action associated with a workload, implemented in accordance with an embodiment.

FIG. 5 is an example flowchart of a method for detecting an action associated with a workload, implemented in accordance with an embodiment. In an embodiment, a workload is deployed as a resource including a plurality of nested resources.

For example, according to an embodiment, a software cluster includes a plurality of nodes, and each node includes a plurality of pods, each pod having a plurality of software containers. Each container is a resource, and pods may share an IP address, an identifier of a node, etc. Therefore, log data alone is often insufficient to associate an action in the computing environment with a specific container.

At S510, a workload is selected. In an embodiment, the workload is a nested workload, such as a container, which is nested in a pod, which in turn is nested in a node. In some embodiments, a plurality of workloads share a common identifier, such as an IP address, a subnet mask, a VPN identifier, a combination thereof, and the like.

In an embodiment, a workload is selected by an inspection controller. In some embodiments, a workload includes a sensor, deployed thereon in a runtime environment of the sensor. According to certain embodiments, a workload includes a plurality of sensors. In some embodiments, a container is a resource including a plurality of nodes, each node having a sensor deployed thereon.

At S520, an identity is associated with a process from the workload. In an embodiment, an identity is a managed identity, a user account, a service account, a role, a permission, a user group, a combination thereof, and the like.

According to an embodiment, an identity is associated with a workload for example by inspecting the workload and detecting thereon a credential, a secret, a token, a certificate, a cryptographic key, a cloud key, a combination thereof, and the like. In some embodiments, the credential, etc., is associated with an identity. In certain embodiments, an identity is associated with a credential, etc. utilizing an identity and access management server.

In certain embodiments, a workload is associated with a plurality of identities. For example, in an embodiment, a first identity is associated with a first process running on the workload, and a second identity is associated with a second process running on the workload.

At S530, an action is detected. In an embodiment, the action is detected in an event log of the computing environment. For example, according to an embodiment, an event log of a cloud computing environment is implemented as Amazon® CloudTrail.

In an embodiment, an action corresponds to an event, a plurality of events, a plurality of events in a predetermined event order, a combination thereof, and the like. In certain embodiments, an action is detected based on a predetermined event type.

In certain events, actions are detected in real time, near real time, and the like. For example, in some embodiments, only certain actions corresponding to events of a predetermined type are monitored for in an event log, thus decreasing the number of records that need to be parsed.

In an embodiment, a secondary cloud log is generated, based on only events of a predetermined type (or types) which correspond to actions which should be monitored for.

At S540, an output is generated. In an embodiment, the output is a report including an action initiated by a process. In some embodiments, the output is an enriched cloud log. For example, according to an embodiment, an output includes events of predetermined types. In an embodiment, each event record of a predetermined type is further enriched with an associated identity, an identifier of a workload, data from static analysis, and the like.

According to an embodiment, an enriched log is advantageous to maintain as it allows to search the enriched log for events which are of particular interest for cybersecurity purposes. For example, certain activities in a cloud computing environment are more likely to indicate a cybersecurity threat, and therefore it is advantageous to have a data record including only such events, without other data which would be considered 'noise'.

In some embodiments, it is further advantageous to have an enriched log which indicates which actions are performed by which workloads utilizing which identities to perform such actions.

Figure 6:
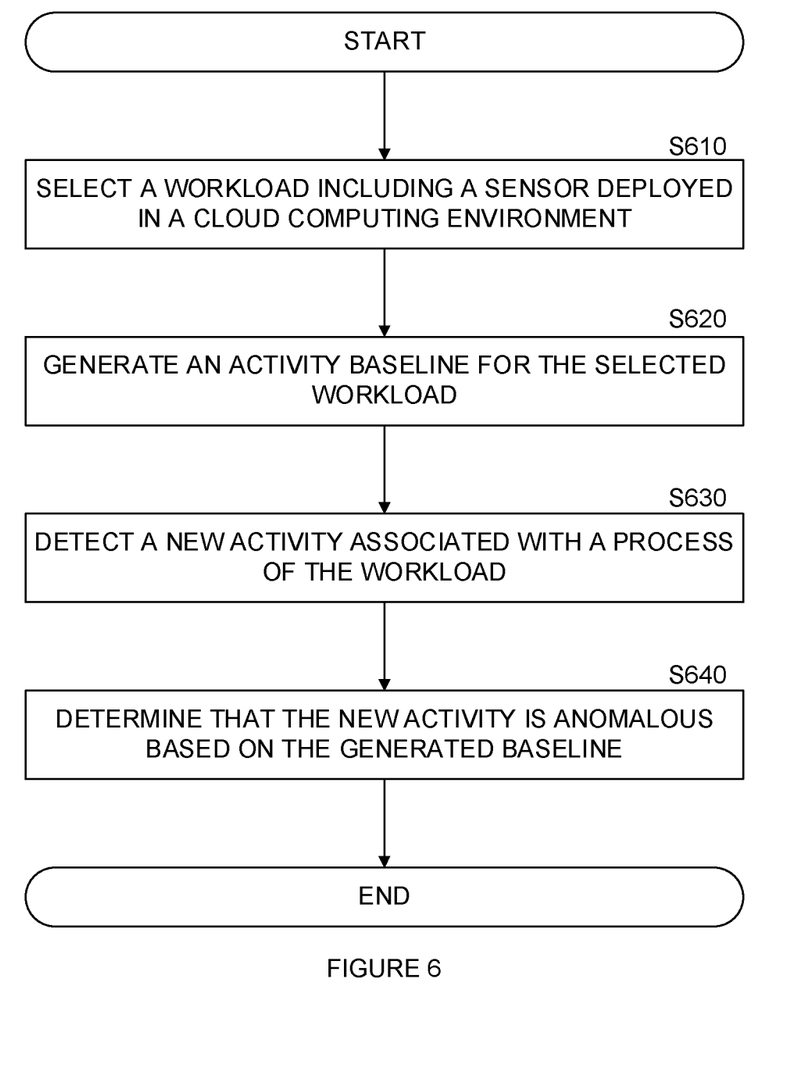
FIG. 6 is an example flowchart of a method for determining an activity baseline for a workload in a computing environment, implemented in accordance with an embodiment.

FIG. 6 is an example flowchart of a method for determining an activity baseline for a workload in a computing environment, implemented in accordance with an embodiment.

At S610, a workload is selected. In an embodiment, the workload is a nested workload, such as a container, which is nested in a pod, which in turn is nested in a node. In some embodiments, a plurality of workloads share a common identifier, such as an IP address, a subnet mask, a VPN identifier, a combination thereof, and the like.

In an embodiment, a workload is selected by an inspection controller. In some embodiments, a workload includes a sensor, deployed thereon in a runtime environment of the sensor. According to certain embodiments, a workload includes a plurality of sensors. In some embodiments, a container is a resource including a plurality of nodes, each node having a sensor deployed thereon.

At S620, an activity baseline is generated. In an embodiment, the activity baseline is generated for the selected workload. In some embodiments, generating an activity baseline includes generating a log, a table, and the like, including identifiers of action types, operation types, communication destination identifiers, a number of such events, and the like.

For example, in an embodiment, an activity baseline of a workload includes a counter of a number of times a process accessed a specific other workload, a counter of a number of times the process accessed an IP range, a counter of a number of times a process initiated an action with a specific workload, a counter of API calls, a counter of API calls of a specific type, a combination thereof, and the like.

In an embodiment, the activity baseline includes an eviction policy, such that counters are periodically, continuously, etc., refreshed by removing data points which are above a threshold value. For example, in an embodiment, data points older than 24 hours are deleted.

In certain embodiments, an activity baseline is generated for each workload. In some embodiments, an activity baseline is generated for each process running on a workload. In certain embodiments, an activity baseline is generated for all workloads of a certain type (e.g., common activity baseline for all virtual machines in a cloud computing environment).

At S630, a new activity is detected. In an embodiment, the new activity is detected in a cloud computing environment log. In an embodiment, the new activity is associated with a process on a workload and an identity. For example, according to an embodiment, the new activity is associated with a process on a workload utilizing runtime data received from a sensor deployed on the workload, static analysis data from inspection of the workload, static analysis data of a code object utilized in deploying the workload, a combination thereof, and the like.

In an embodiment, detecting the new activity and associating the new activity with a process, the process deployed in runtime on a workload, is performed using the method described in more detail herein.

At S640, the new activity is determined as anomalous. In an embodiment, detecting an anomalous activity is performed by matching a data field of the anomalous activity to the generated baseline. For example, in an embodiment, a check is performed to determine how often the new activity (e.g., the event indicating the new activity) has previously occurred. In an embodiment, where the check indicates a value below a threshold, the new activity is classified as an anomalous activity.

In certain embodiments, an anomalous activity is: a process which calls an API with a target account that was not previously called, a process generating an API call from a location in code that hasn't performed an API call in the past, an API call which the workload has never performed in the past, a combination thereof, and the like.

According to some embodiments, anomalous activity is detected based on a rule, a conditional rule, a policy, a combination thereof, and the like. For example, in an embodiment, a rule is applied on an event of an enriched log to determine if the event complies with the rule. In some embodiments, where the event of the enriched log does not comply with the rule, a mitigation action is initiated.

Figure 7:
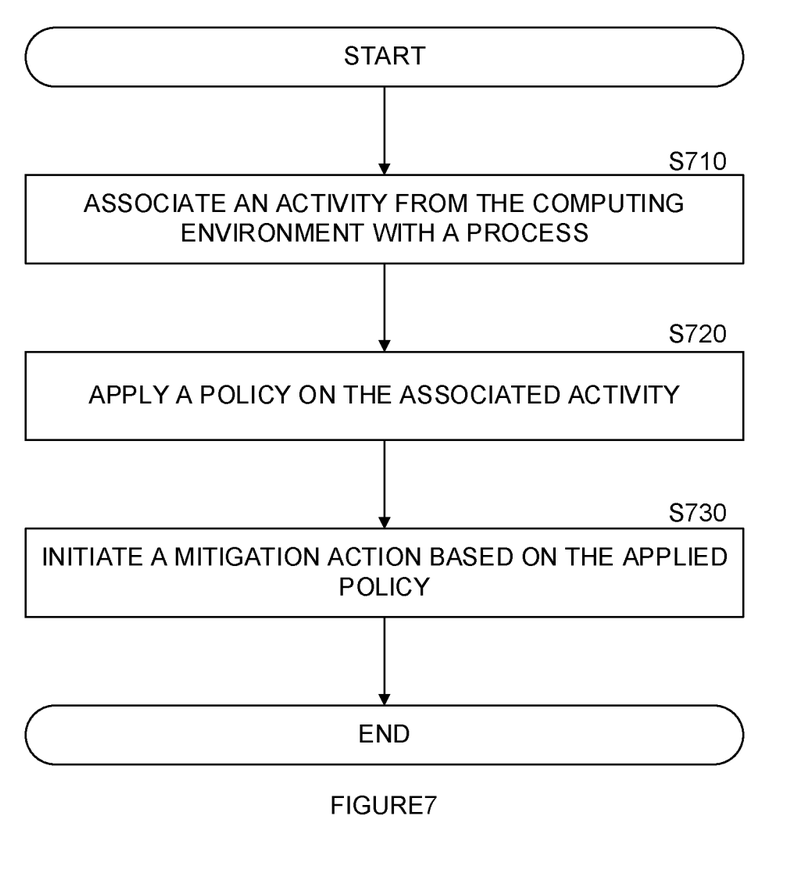
FIG. 7 is an example flowchart of a method for initiating a mitigation action based on a process-associated event in a cloud computing environment, implemented in accordance with an embodiment.

FIG. 7 is an example flowchart of a method for initiating a mitigation action based on a process-associated event in a cloud computing environment, implemented in accordance with an embodiment.

At S710, an activity is associated with a process. In some embodiments, an activity incudes an event, a plurality of events, a predetermined event type, a combination thereof, and the like. In certain embodiments, an event is detected in a log of a computing environment, such as a cloud log of a cloud computing environment, a network log, an access log, various combinations thereof, and the like.

In an embodiment, associating an activity with a process includes deploying a sensor on a workload, the workload deploying a plurality of processes in a runtime environment. According to an embodiment, a runtime process includes a plurality of computer instructions which are actively processed by the workload, for example by a processing circuitry of, or allocated to, the workload.

In some embodiments, the sensor is a runtime process, a kernel process, and the like. According to some embodiments, the sensor is configured to detect a runtime process, including a process identifier, an API call, an instruction execution request, and the like. In an embodiment, the sensor is deployed in a software container cluster which further includes an admission controller.

According to an embodiment, the workload is inspected for a cybersecurity object. In an embodiment, the cybersecurity object is utilized to associate the workload with a code object (for example in an IaC platform). In an embodiment, an inspection controller is configured to analyze the code object to detect API calls, workload identifiers, cloud service identifiers, credentials, secrets, cybersecurity objects, combinations thereof, and the like.

In certain embodiments, the runtime process is associated with a code object, with an identifier of a workload on which the runtime process is executed, a combination thereof, and the like. In an embodiment, the runtime process is further associated with an event in a log.

For example, in some embodiments, a computing environment includes an activity log, a cloud log, a network log, an event log, various combinations thereof, and the like. In certain embodiments, an enriched log is generated based on detected events in a log, and associating an event with a runtime process. For example, in an embodiment, an event includes an identifier of a workload. Based on the identifier of the workload, sensor data is utilized to determine which process running on the workload is associated with the event.

At S720, a policy is applied on the associated activity. In an embodiment, a policy is applied only on activities associated with a runtime process. According to certain embodiments, a policy is applied by a policy engine. In some embodiments, the policy engine is configured to send an admission controller a policy, a rule, a conditional rule, and the like, which the admission controller is configured to apply.

In certain embodiments, the policy engine is configured to apply a policy on an event of an enriched log. For example, according to an embodiment, a policy is applied by applying a condition to determine if the event record complies with the policy.

In an embodiment, a policy is applied based on a plurality of conditions. For example, according to some embodiments, a policy, rule, and the like, are applied on an event where the event is of a first type, and an anomaly was detected with respect to a value of the event.

At S730, a mitigation action is initiated. In an embodiment, the mitigation action is initiated in response to applying the policy. In some embodiments, the policy, when applied to an activity, an event record, and the like, initiates a mitigation action in response to determining that a condition of the policy is not met. In certain embodiments, the policy, when applied to an activity, an event record, and the like, initiates a mitigation action in response to determining that a condition of the policy is met.

In certain embodiments, the mitigation includes blocking network traffic, configuring a firewall to block network traffic to a workload, block network traffic from the workload, sandbox the workload, revoke a permission, configuring an admission controller to initiate an instruction, a combination thereof, and the like.

For example, in an embodiment, a mitigation action includes configuring an admission controller of a software container platform to initiate an instruction. In an embodiment, the admission controller is configured to perform actions on communication to a node, from a node, initiate an action in a container cluster, a combination thereof, and the like.

Figure 8:
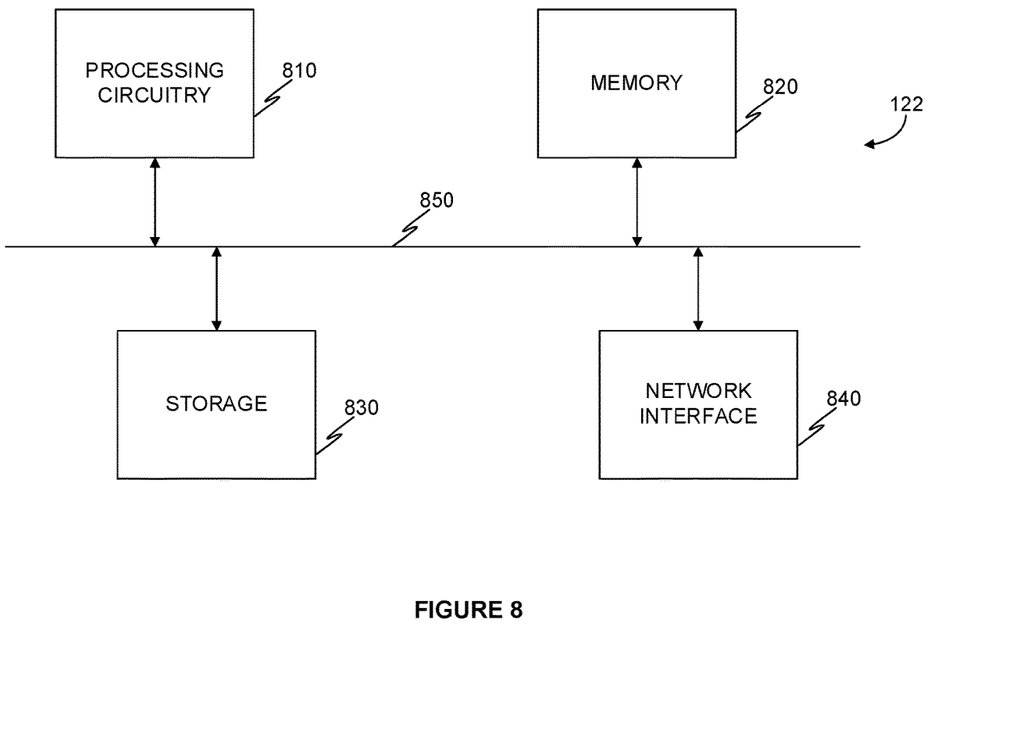
FIG. 8 is an example schematic diagram of an inspection controller according to an embodiment.

FIG. 8 is an example schematic diagram of an inspection controller 122 according to an embodiment. The inspection controller 122 includes, according to an embodiment, a processing circuitry 810 coupled to a memory 820, a storage 830, and a network interface 840. In an embodiment, the components of the inspection controller 122 are communicatively connected via a bus 850.

In certain embodiments, the processing circuitry 810 is realized as one or more hardware logic components and circuits. For example, according to an embodiment, illustrative types of hardware logic components include field programmable gate arrays (FPGAs), application-specific integrated circuits (ASICs), Application-specific standard products (ASSPs), system-on-a-chip systems (SOCs), graphics processing units (GPUs), tensor processing units (TPUs), Artificial Intelligence (AI) accelerators, general-purpose microprocessors, microcontrollers, digital signal processors (DSPs), and the like, or any other hardware logic components that are configured to perform calculations or other manipulations of information.

In an embodiment, the memory 820 is a volatile memory (e.g., random access memory, etc.), a non-volatile memory (e.g., read only memory, flash memory, etc.), a combination thereof, and the like. In some embodiments, the memory 820 is an on-chip memory, an off-chip memory, a combination thereof, and the like. In certain embodiments, the memory 820 is a scratch-pad memory for the processing circuitry 810.

In one configuration, software for implementing one or more embodiments disclosed herein is stored in the storage 830, in the memory 820, in a combination thereof, and the like. Software shall be construed broadly to mean any type of instructions, whether referred to as software, firmware, middleware, microcode, hardware description language, or otherwise. Instructions include, according to an embodiment, code (e.g., in source code format, binary code format, executable code format, or any other suitable format of code). The instructions, when executed by the processing circuitry 810, cause the processing circuitry 810 to perform the various processes described herein, in accordance with an embodiment.

In some embodiments, the storage 830 is a magnetic storage, an optical storage, a solid-state storage, a combination thereof, and the like, and is realized, according to an embodiment, as a flash memory, as a hard-disk drive, another memory technology, various combinations thereof, or any other medium which can be used to store the desired information.

The network interface 840 is configured to provide the inspection controller 122 with communication with, for example, the computing environment 110, according to an embodiment.

It should be understood that the embodiments described herein are not limited to the specific architecture illustrated in FIG. 8, and other architectures may be equally used without departing from the scope of the disclosed embodiments.

Furthermore, in certain embodiments the inspector 124, the policy engine 125, the sensor backend 128, the security database 126, a combination thereof, and the like, may be implemented with the architecture illustrated in FIG. 8. In other embodiments, other architectures may be equally used without departing from the scope of the disclosed embodiments.

The various embodiments disclosed herein can be implemented as hardware, firmware, software, or any combination thereof. Moreover, the software is preferably implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more processing units ("PUs"), a memory, and input/output interfaces. The computer platform may also include an operating system and microinstruction code. The various processes and functions described herein may be either part of the microinstruction code or part of the application program, or any combination thereof, which may be executed by a PU, whether or not such a computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

All examples and conditional language recited herein are intended for pedagogical purposes to aid the reader in understanding the principles of the disclosed embodiment and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

It should be understood that any reference to an element herein using a designation such as "first," "second," and so forth does not generally limit the quantity or order of those elements. Rather, these designations are generally used herein as a convenient method of distinguishing between two or more elements or instances of an element. Thus, a reference to first and second elements does not mean that only two elements may be employed there or that the first element must precede the second element in some manner. Also, unless stated otherwise, a set of elements comprises one or more elements.

As used herein, the phrase "at least one of" followed by a listing of items means that any of the listed items can be utilized individually, or any combination of two or more of the listed items can be utilized. For example, if a system is described as including "at least one of A, B, and C," the system can include A alone; B alone; C alone; 2A; 2B; 2C; 3A; A and B in combination; B and C in combination; A and C in combination; A, B, and C in combination; 2A and C in combination; A, 3B, and 2C in combination; and the like.

What is claimed is:

1. A method for detecting cloud identity misuse in a cloud computing environment, comprising:
   deploying a runtime sensor on a workload in a cloud computing environment;
   continuously receiving data from the runtime sensor;
   detecting an identifier of a runtime process in the continuously received data;
   generating an activity baseline for the runtime process based on the continuously received data, wherein the runtime sensor is configured to detect a plurality of runtime processes on the workload;
   detecting an event in a cloud log, the event including an identifier of the workload;
   associating the runtime process detected by the runtime sensor on the workload with the event detected in the cloud log based at least on the identifier of the workload; and
   determining that the event detected in the cloud log is an anomalous event based on the generated activity baseline of the runtime process.

2. The method of claim 1, further comprising:
   inspecting a code object for a cybersecurity object, the code object utilized in deploying the workload in the cloud computing environment;
   associating the runtime process with the event based on an identifier of the workload and the cybersecurity object, wherein the cybersecurity object indicates an identity utilized by the workload.

3. The method of claim 1, further comprising:
   generating the activity baseline based on a plurality of events detected in the continuously received data.

4. The method of claim 3, further comprising:
   generating the activity baseline only based on a group of events of the plurality of events corresponding to a first event type.

5. The method of claim 1, further comprising:
   generating the activity baseline based on a plurality of workload runtime data, each workload sharing a common identifier.

6. The method of claim 1, further comprising:
   removing a data point from the activity baseline based on an eviction policy.

7. The method of claim 1, further comprising:
   detecting a plurality of processes by the runtime sensor on the workload; and
   generating a unique activity baseline for each detected process.

8. The method of claim 1, further comprising:
   generating the activity baseline further based on detected events in the cloud log.

9. The method of claim 1, wherein the anomalous event indicates any one of: a process which calls an application programming interface (API) with a target account that was not previously called, a process generating an API call from a location in code that never performed an API call previously, an API call which the workload has never performed previously, and any combination thereof.

10. A non-transitory computer-readable medium storing a set of instructions for detecting cloud identity misuse in a cloud computing environment, the set of instructions comprising:
    one or more instructions that, when executed by one or more processors of a device, cause the device to:
    deploy a runtime sensor on a workload in a cloud computing environment;
    continuously receive data from the runtime sensor;
    detect an identifier of a runtime process in the continuously received data;
    generate an activity baseline for the runtime process based on the continuously received data, wherein the runtime sensor is configured to detect a plurality of runtime processes on the workload;
    detect an event in a cloud log, the event including an identifier of the workload;
    associate the runtime process detected by the runtime sensor on the workload with the event detected in the cloud log based at least on the identifier of the workload; and
    determine that the event detected in the cloud log is an anomalous event based on the generated activity baseline of the runtime process.

11. A system for detecting cloud identity misuse in a cloud computing environment comprising:
    a processing circuitry;
    a memory, the memory containing instructions that, when executed by the processing circuitry, configure the system to:
    deploy a runtime sensor on a workload in a cloud computing environment;
    continuously receive data from the runtime sensor;
    detect an identifier of a runtime process in the continuously received data;
    generate an activity baseline for the runtime process based on the continuously received data, wherein the runtime sensor is configured to detect a plurality of runtime processes on the workload;
    detect an event in a cloud log, the event including an identifier of the workload;
    associate the runtime process detected by the runtime sensor on the workload with the event detected in the cloud log based at least on the identifier of the workload; and
    determine that the event detected in the cloud log is an anomalous event based on the generated activity baseline of the runtime process.

12. The system of claim 11, wherein the memory contains further instructions which when executed by the processing circuitry further configure the system to:
    inspect a code object for a cybersecurity object, the code object utilized in deploying the workload in the cloud computing environment; and
    associate the runtime process with the event based on an identifier of the workload and the cybersecurity object, wherein the cybersecurity object indicates an identity utilized by the workload.

13. The system of claim 11, wherein the memory contains further instructions which when executed by the processing circuitry further configure the system to:
    generate the activity baseline based on a plurality of events detected in the continuously received data.

14. The system of claim 13, wherein the memory contains further instructions which when executed by the processing circuitry further configure the system to:
    generate the activity baseline only based on a group of events of the plurality of events corresponding to a first event type.

15. The system of claim 11, wherein the memory contains further instructions which when executed by the processing circuitry further configure the system to:
   generate the activity baseline based on a plurality of workload runtime data, each workload sharing a common identifier.

16. The system of claim 11, wherein the memory contains further instructions which when executed by the processing circuitry further configure the system to:
   remove a data point from the activity baseline based on an eviction policy.

17. The system of claim 11, wherein the memory contains further instructions which when executed by the processing circuitry further configure the system to:
   detect a plurality of processes by the runtime sensor on the workload; and
   generate a unique activity baseline for each detected process.

18. The system of claim 11, wherein the memory contains further instructions which when executed by the processing circuitry further configure the system to:
   generate the activity baseline further based on detected events in the cloud log.

19. The system of claim 11, wherein the anomalous event indicates any one of:
   a process which calls an application programming interface (API) with a target account that was not previously called, a process generating an API call from a location in code that never performed an API call previously, an API call which the workload has never performed previously, and any combination thereof.

* * * * *